United States Patent [19]
Heilmann

[11] Patent Number: 5,305,946
[45] Date of Patent: Apr. 26, 1994

[54] WELDING PROCESS FOR CLAD METALS

[75] Inventor: Leroy W. Heilmann, Belleville, Ill.

[73] Assignee: Nooter Corporation, St. Louis, Mo.

[21] Appl. No.: 972,418

[22] Filed: Nov. 5, 1992

[51] Int. Cl.$^5$ ............................................. B23K 28/02
[52] U.S. Cl. ................................... 228/184; 220/586;
220/679; 220/DIG. 29; 228/226
[58] Field of Search ............... 228/184, 107, 119, 226;
220/586, 679, DIG. 29

[56]     References Cited
U.S. PATENT DOCUMENTS

| | | | |
|---|---|---|---|
| 2,209,290 | 7/1940 | Watts | 228/107 X |
| 3,281,930 | 11/1966 | Fordham | 228/107 |
| 3,443,306 | 5/1969 | Meyer | 228/189 |
| 3,457,961 | 7/1969 | Long | 220/586 X |
| 4,272,005 | 6/1981 | Jackson et al. | 228/107 |
| 4,485,960 | 12/1984 | Sagan et al. | 228/107 |
| 4,688,691 | 8/1987 | Cristain | 228/184 |

*Primary Examiner*—Kenneth J. Ramsey
*Attorney, Agent, or Firm*—Polster, Lieder, Woodruff & Lucchesi

[57]     ABSTRACT

A weldment, such as the wall of a pressure vessel, is formed from segments, each of which includes a steel substrate, a protective layer of tantalum which is exposed to the interior of the vessel and an intervening layer of copper which lies between and is bonded to the substrate and the protective layer. The substrate and the two layers which form the cladding are explosively bonded together and the bonding procedure may leave the protective layer with small domes or embossments and pockets of trapped gas behind the embossments. The two segments are welded together edge-to-edge at their substrates, with their protective and intervening layers aligned. If one were to follow the traditional procedure, one would place a tantalum batten strip over the protective layers along the opposed edges so as to cover the edges, and then weld the batten strip to the protective layer along the edges of the strip. But any weld which passed over a pocket would open the pocket, causing the trapped gas to burst out and carry molten copper from the intervening layer with it, and of course the copper would contaminate the weld, leaving it less capable of resisting chemical attack. This problem is alleviated by venting the pockets over which the batten strip passes with small holes and driving their embossments down. The batten strip overlies the holes so corrosive substances will not pass through the protective layer.

20 Claims, 2 Drawing Sheets

WELDING PROCESS FOR CLAD METALS

BACKGROUND OF THE INVENTION

The invention relates in general to welding and more particularly to joining together by welding plates or wall segments each comprised of one metal clad with another metal.

Some chemical reactions require high pressures and temperatures, and hence must occur within a pressure vessel, that is, within a vessel capable of withstanding the elevated pressures. The vessel must also resist attack by the chemicals which are introduced into it as well as those produced in the chemical reactions. While steel possesses substantial strength, it is not in and of itself ideally suited for the construction of pressure vessels since it reacts with quite a few substances. Certainly, it cannot be exposed to highly corrosive substances, such as many acids—and some highly corrosive substances are produced under elevated pressures and temperatures. Refractory metals, such as tantalum, zirconium and titanium, do not react as readily with most corrosive substances, even at high temperatures and pressures, and further possess considerable strength, but they are also quite expensive, and to manufacture a large pressure vessel from any one of them would be prohibitive. The industry has therefore turned to steel plates clad with refractory metal. Fabricators weld these plates together to create vessels in which the refractory metal claddings are exposed to the interiors of the vessels where the reactions occur. The claddings protect the steel from the corrosive substances in the vessels, whereas the steel withstands the stresses produced by the elevated pressures.

Refractory metals do not bond easily to steel. Indeed, much of the clad plate is derived from an explosive bonding process. In essence, a thin layer of refractory metal, which is covered with an explosive, is laid over a steel plate or substrate separated by small Styrafoam spacers. When the explosive is ignited, the explosion ejects the spacers and drives the refractory metal against the steel plate, producing a diffusion bond between the two. Where tantalum is the refractory metal, a thin layer of copper is normally interposed between the tantalum layer and the steel substrate. The copper bonds well to both the steel and the tantalum and further, being quite ductile, yields when the clad plate is rolled or otherwise formed into the contours required for pressure vessel walls. More importantly, it serves as a heat sink when the tantalum is welded and thus dissipates the heat so that the concentrated high temperature of the weld is not transmitted to the steel. In this regard, tantalum melts at 5200° F., whereas steel melts at about 2800° F. Were the tantalum directly against the steel, any weld in the thin layer of tantalum might melt the underlying steel and change the physical characteristics of the steel, thereby weakening the steel in that region. The intervening copper layer, on the other hand, absorbs much of the heat and distributes it so that the underlying steel does not experience excessively high temperatures and undergo a change in its physical characteristics.

Normally the tantalum layer has a thickness of no more than about 0.035-0.040 inches. At that thickness it bonds well to the copper, the explosive bonding procedure, producing a bond which is uniform throughout. However, some specifications call for a thicker cladding of tantalum—indeed a tantalum layer that is 0.060 inches thick or thicker. At that thickness, the explosive bonding procedure may not yield a uniform bond, but instead the bond may be characterized by a multitude of small domes or embossments in the tantalum layer. These domes or embossments represent regions where gas and ash is trapped between the tantalum and the copper, gas and ash which derives from the consumption of the Styrofoam spacers used in the explosive bonding procedure. At the embossments no bond exists between the copper and tantalum layers, and indeed the two layers are actually separated. The absence of a bond at these locations may not impair the operation of the pressure vessel, since the tantalum still isolates the steel from the interior of the vessel. But it does affect the fabrication of the vessel.

In this regard, the domes or embossments are numerous enough that at least several of them will lie along welds later made in the tantalum layer as part of the fabrication procedure for the vessel. Of course, the tantalum melts at the head of a narrow bead as the tantalum is welded, and when this bead reaches one of the embossments, it opens the pocket of trapped gas and ash at the embossment. Molten copper and tantalum spew from the pocket, leaving the tantalum in this region contaminated with copper. As such, the cladding in this region will not resist corrosive substances nearly as well.

Of course, one could cover the regions of the tantalum that are contaminated with copper with tantalum cover plates, but this is expensive and gives the appearance of poor workmanship.

The present invention resides in a process for joining clad plates having pockets of trapped gases between the cladding and substrate. It also resides in a pressure vessel or other fabrication formed from the plates joined by the welding process.

In the accompanying drawings which form part of the specification and wherein like numerals and letters refer to like parts wherever they occur:

DETAILED DESCRIPTION

Figure 1:
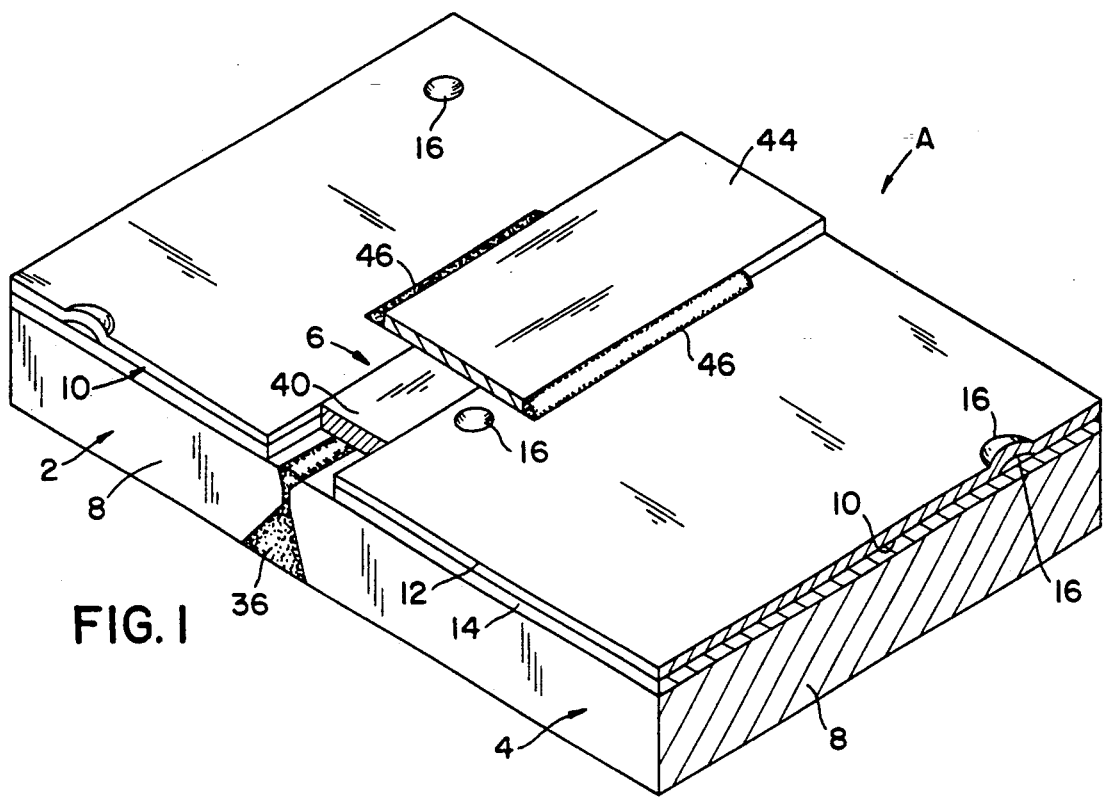
FIG. 1 is a perspective view of a weldment constructed in accordance with and embodying the invention.

Referring now to the drawings, a weldment A (FIG. 1) consists of at least two cladded segments 2 and 4 which are connected edge-to-edge at a joint 6. Typically, the weldment A is a pressure vessel, and the segments 2 and 4 are plates contoured to conform with the configuration of the vessel at their particular location within the vessel. As such, they may be segments of a cylinder, or a sphere, a hemisphere, or for that matter any other geometrical shape found in the vessel.

Being clad, each segment 2 and 4 has a backing or substrate 8 (FIG. 1), which is preferably formed from steel plate, and a cladding 10 which may take the form of one or more layers of some other metal, normally a refractory metal, that is bonded to the substrate 8. Where the segments 2 and 4 are exposed to highly corrosive substances under elevated temperatures and pressures, the cladding 10 preferably includes a layer 12 of tantalum which is exposed to the interior of the vessel and a layer 14 of copper which is interposed between the substrate 8 and the tantalum layer 12. Indeed, the copper layer 14 is diffusion bonded to the steel of the substrate 8, whereas the tantalum layer 12 is diffusion bonded to the copper layer 14. Both layers 12 and 14 are about 0.060 inches thick. This is the traditional thickness for the copper layer 14. But the tantalum layer 12 is somewhat thicker than typical and as a consequence of the greater thickness, may not be bonded throughout to the copper layer 14. Instead, the tantalum layer 12 may be separated from copper at random locations, creating slight domes or embossments 16 in the tantalum layer 12, and beneath each embossment 16 lies a pocket 18 which contains ash and trapped gas.

Figure 2:
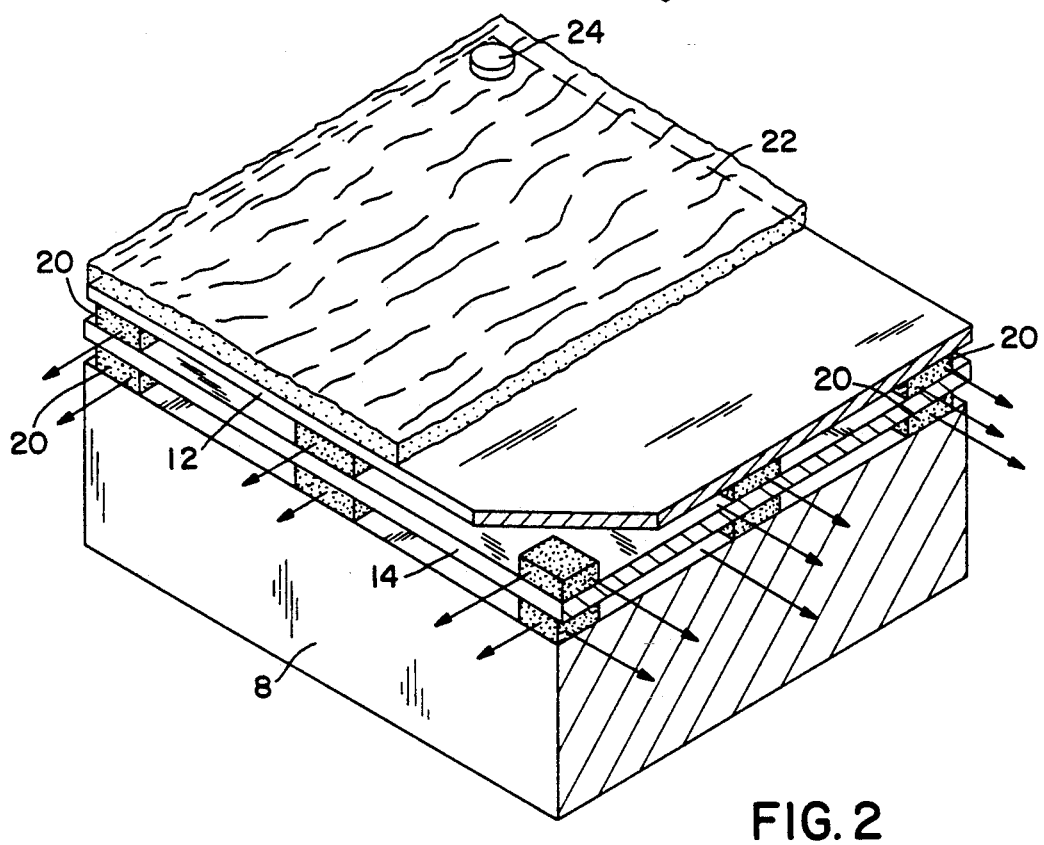
FIG. 2 is a schematic view in perspective illustrating the explosive bonding procedure for forming the clad plate.

The embossments 16, which measure about 3/16 to ⅜ inches in diameter and the corresponding pockets 18 derive from the process by which the clad segments 2 and 4 are produced. In this regard the substrate 8, the copper layer 14, and the tantalum layer 12 are stacked in that order with small spacers 20 separating them (FIG. 2). The spacers 20, which are formed from Styrafoam plastic or a similar material, measure about ½ inches in width and ⅝ to ¾ inches in length and are about ⅛ to 3/16 inches thick. Enough of them are placed between the steel substrate 8 and the copper layer 14 to insure that the copper layer 14 remains separated from the steel substrate 8. Likewise enough are scattered between the tantalum layer 12 and the copper layer 14 to insure that the tantalum layer 12 is totally separated from the copper layer 14. With the substrate 8 and the two layers 12 and 14 so arranged, and the tantalum layer 12 is presented upwardly, an explosive charge 22 is placed over the tantalum layer 12. The charge 22 may take the form of a powder which is spread over the entire upper surface of the tantalum layer 12. At one corner of charge 22 a detonator 24 is embedded within the powder of the charge 22. The substrate 8, on the other hand, rests on a firm foundation.

When activated, the detonator 24 ignites the charge which explodes and slams the tantalum layer 12 into the copper layer 14 and the copper layer 14 into the steel substrate 8 with enough heat and force to effect diffusion bonds between them. Actually, the explosion propagates somewhat as a wave across the tantalum layer 12, and as it does, it blows the Styrafoam spacers 20 out of the space between the copper layer 14 and the steel substrate 8. If the tantalum layer 12 were no thicker than about 0.040 inches, it would likewise blow the spacers 20 out from the space between the tantalum layer and the copper layer 14. But when the thickness of the tantalum layer 12 approaches or exceeds 0.060 inches, the spacers 20 tend to remain in the space between the tantalum layer 12 and the copper layer 14. The heat of the explosion simply reduces them to ash and gas which are captured between the two layers 12 and 14 in the pockets 18. Indeed, this accounts for the pockets 18 and the corresponding embossments 16. Since the ash and trapped gas prevent the tantalum layer 12 from contacting the copper layer 14 at the pockets 16, no bond between the two layers 12 and 14 exists at the pockets 18, but this is of little significance, because the tantalum layer 12 remains firmly bonded to the copper layer 14 at the surrounding regions, which occupy a much larger surface area, and the integrity of the tantalum layer 12 is not in anyway diminished.

Explosive bonding procedures are disclosed in U.S. Pat. Nos. 3,397,444, 3,493,353, 3,554,126, 3,205,574, 3,233,312 and 3,264,731, granted to E.I. du Pont de Nemours and Company of Wilmington, Del.

When initially joined by explosive bonding, the substrate 8 and the two layers 12 and 14 all possess a rectangular configuration; they have their edges generally in registration and are planar. In effect, they are cladded rectangular plates, but even so they are not suited for use in pressure vessels or other weldments. The fabricator of the weldment A acquires these plates, cuts them to a desired configuration and imparts a desired contour to them by rolling or other techniques. The fabricator also prepares the edges for welding. Thus, the fabricator performs the final steps which convert the cladded flat rectangular plates into the segments 2 and 4 which are ultimately joined to each other and other plates to form the weldment A.

Figure 3:
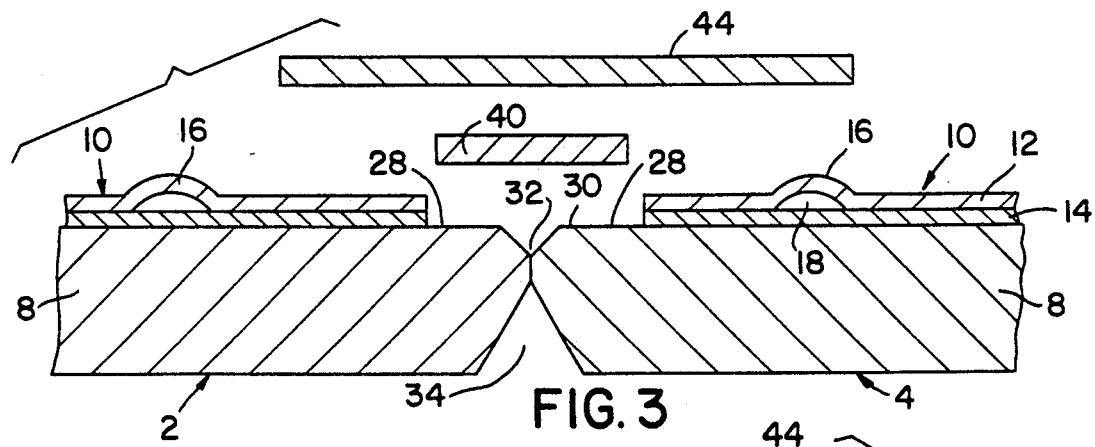
FIG. 3 is an exploded sectional view showing the clad plates abutted prior to welding.

To prepare the edges of the segments 2 and 4 for welding, the cladding 10 is removed along an edge of each all the way down to the steel substrate 8, such as by grinding or machining or both, thereby producing a rabbet 28 on each of the segments 2 and 4 (FIG. 3). The steel substrate 8, on the other hand, is at the same edge machined to provide two bevels of unequal size, the larger being along the back or uncladded surface of the substrate 8. When the two segments 2 and 4 are brought together edge-to-edge with their claddings 10 aligned, the rabbets 28 produce a shallow groove 30 in the otherwise aligned claddings 10. The small bevels in the steel substrate 8, on the other hand, produce a V-shaped groove 32 that opens into the shallow groove 30 of the cladding 10. The larger bevels create a V- or U-shaped groove 34 that opens out of the backfaces of the aligned substrates 8.

Figure 4:
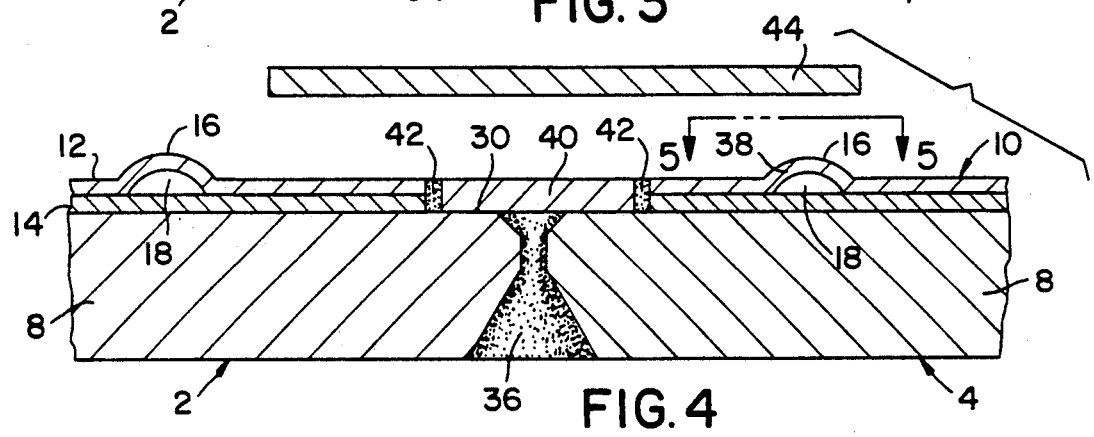
FIG. 4 is a sectional view showing the clad plates welded at their substrates and with a filler strip in place.

Thereupon, the two segments 2 and 4, while remaining aligned edge-to-edge, are joined at their substrates 8 by welds 36 which fill the grooves 32 and 34 formed by the edge bevels in the aligned substrates 8 (FIG. 4). The weld metal is a steel compatible with the steel of the substrates 8, and it completely fills the grooves 32 and 34. Any weld metal which protrudes into the shallow groove 30 in the aligned claddings 10 is ground flush with the floor of that groove 30.

Figure 5:
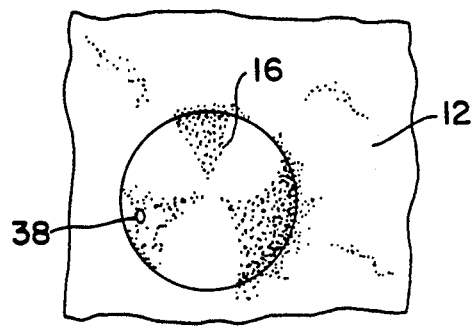
FIG. 5 is a plan view taken along line 5—5 of FIG. 4 and showing one of the embossments.

In further preparation, any pockets 18 which lie within the tantalum layer 12 close to the rabbets 28 and the shallow groove 30 formed by them are vented, if they have not already been vented in the formation of the rabbets 28. To this end, the tantalum layer 12 is pierced at each embossment 16 along the rabbet 28 by simply drilling through the tantalum layer 12 and into the pocket 18 behind it to provide a small vent hole 38 (FIGS. 4 and 5). But the hole 38 should pierce the embossment 16 as close to the rabbet 28 as possible, and to this end should lie along the periphery of the embossment 16 and should preferably extend obliquely into the pocket 18 behind the embossment 16. The object is to place the vent hole 38 at a location where it will eventually be covered. Once the embossment 16 is provided with a vent hole 38, it is hammered down so that it no longer projects from the exposed surface of the tantalum layer 12.

Next the shallow groove 30 in the cladding 10 is filled with a copper filler strip 40 (FIG. 4) which is slightly narrower than the groove 30, but equal in thickness to the depth of the groove 30. Indeed, the strip 40 is secured in place by welding it along its edges to the edges of both the tantalum and copper layers 12 and 14, preferably using copper as the weld metal. This produces two welds 42 which fill the spaces between the side edges of the copper filler strip 40 and those edges of the tantalum and copper layer 12 and 14 that are exposed at the groove 30.

Figure 6:
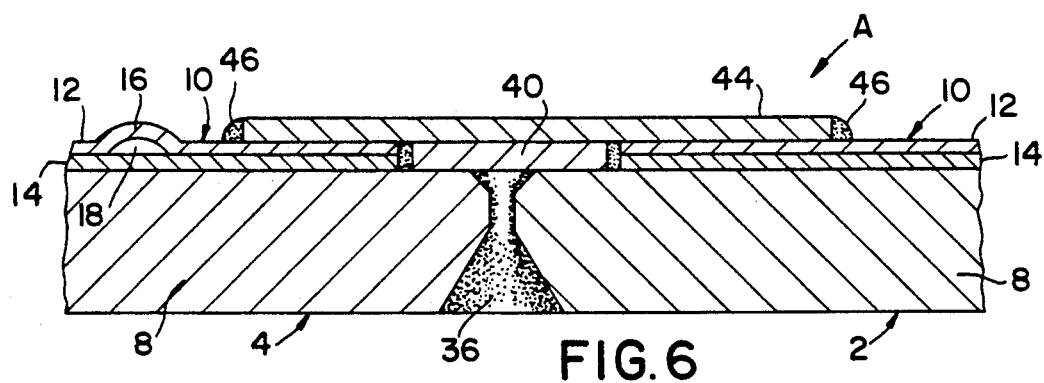
FIG. 6 is a sectional view showing the completed joint between the two plates.

The filler strip 40, being formed from copper, will not resist attack by corrosive substances, and to protect it and the surfaces which it overlies, a batten strip 44 is installed over the filler strip 40 (FIG. 6). The batten strip 44, which is formed from tantalum 12 that is at least as thick as the tantalum layer 12, is considerably wider than the filler strip 40. Indeed, the batten strip 44 is considerably wider than the groove 30—wide enough to extend over the holes 38 which vent the Pockets 16 that lie near the shallow groove 30 in the cladding 10. With the batten strip 44 centered over the groove 30, it is tack welded along its edges to the tantalum layer 12 using tantalum as the weld metal (FIG. 6), and this of course secures the batten strip 44 in its final position. Thereafter, it is welded along both of its edges with tantalum weld metal to produce two fillet welds 46 which are continuous, so that only tantalum in the form of the tantalum layers 12, the batten strip 44 and the welds 46 is exposed on one face of the weldment A formed by the joinder of the two segments 2 and 4. The welds 46 must, of course, penetrate the edges of the batten strip 44 and the underlying tantalum layers 12, but they should not fully penetrate the tantalum layers 12 and enter the underlying copper layers 14.

In this regard, tantalum melts at approximately 5200° F., whereas copper melts at only about 2000° F. By reason of this large differential in melting temperatures, the copper layer 14 in the region of the welds 46 probably melts, but this is desirable because it distributes the heat generated by the welding over a substantial region of the steel substrate 8 and thereby prevents any region at the substrate 8 from reaching a temperature which would change its crystaline structure and physical properties. Were the welds 46 to completely penetrate the tantalum layers 12, the copper of the layers 14 would surely melt, so that the welds 46 would contain both tantalum and copper. They could thus not withstand corrosive substances and would fail, leading to failure of the entire weldment A. Thus, the steel welds 36 between the substrates 8, the filler strip 40 and its welds 42, and the batten strip 44 and its welds 46 complete the joint 6 at which the two segments 2 and 4 are joined. Leaving only tantalum in the form of the batten strip 44 and its welds 46 exposed, the joint 6 maintains the integrity of the tantalum layers 12 on each side of it, so that only tantalum metal is exposed on one face of the weldment A. Where the weldment A is part of a pressure vessel which contains corrosive substances at elevated temperatures and pressures, this surface is, of course, exposed to the interior of the vessel.

Only those embossments which will eventually lie beneath the batten strip 44 or its welds 46 should be vented with vent holes 38 and hammered down. The danger in ignoring these embossments 16 not only resides in an uneven surface which the batten strip 44 will not match, but also in contaminating the welds 46 by which the batten strip 44 is fastened to the tantalum layer 12. In this regard, each pocket 18 represents trapped gases which reach considerable pressure when elevated to the temperature at which tantalum melts—and welding melts tantalum. Thus, if one of the welds 46 were to cross an embossment 16, it would weaken the tantalum of the layer 12 at the embossment 16 enough to enable the trapped gases to escape in the form of an eruption. Since the copper of the layer 14 beneath the tantalum layer 12 lies molten in the region of the weld 44, molten copper will likewise escape in the eruption. In effect, the copper will mix with the tantalum in the region of the weld 46, and wherever that exists the cladding 10 will not resist attack by corrosive substances.

This invention is intended to cover all changes and modifications of the example of the invention herein chosen for purposes of the disclosure which do not constitute departures from the spirit and scope of the invention.

What is claimed is:

1. A process for joining two segments into a weldment, each segment having a substrate formed from one metal and a protective layer which is formed from another metal that is attached to the substrate and includes embossments which cover pockets in which gas is trapped, said process comprising: welding the two substrates together at edges of the segments such that the protective layers are generally aligned at those edges of the segments; venting the pockets which are located along the edges of the segments; placing a batten strip over the protective layers of the two segments such that it projects laterally beyond the edges of both segments and covers the locations where the pockets are vented; and welding the batten strip along its edges to the protective layer, with the welds so formed being continuous along the edges of the batten strip so as to isolate the edges of the protective layers and the pockets from substances to which the protective layer is exposed.

2. The process according to claim 1 and further comprising driving the embossments downwardly toward the substrate before welding the batten strip to the protective layer.

3. The process according to claim 1 wherein the step of venting the pocket includes drilling a hole through the protective layer into each pocket which is to be vented; and wherein the batten strip overlies the holes so drilled.

4. The process according to claim 1 and further comprising forming a rabbet at the edge of each segment, with the rabbet eliminating the protective layer where is exists, whereby the rabbets in the two segments form a groove, and placing a filler strip in the groove; and wherein the batten strip overlies the filler strip as well as the protective layers on each side of the filler strip.

5. The process according to claim 4 wherein an intervening layer lies between and is bonded to the protective layer and the substrate, and the pockets exist between the protective layer and the intervening layer; wherein the rabbet also eliminates the intervening layer along the opposed edges of the segments; and wherein the filler strip lies flush with the exposed surface of the protective layer.

6. The process according to claim 5 wherein the intervening layer and the filler strip are formed from the same metal, and that metal melts at a temperature below the temperature at which the protective layer melts.

7. The process according to claim 1 wherein the protective layers of the two plates are formed from the same metal, and the batten strip is formed from the same metal as the protective layers.

8. The process according to claim 7 wherein the weld by which the batten strip is attached to the protective layers is formed from the same metal as the protective layers and the batten strip.

9. The process according to claim 8 wherein the substrates of the two segments are steel, and the protective layers, the batten strip and the welds along the edges of the batten strips are formed from tantalum.

10. A process for joining two segments into a weldment, with each segment including a steel substrate, a protective layer which is exposed at one surface of the segment and is formed from a metal which resists corrosion, and a metal intervening layer which lies between and is bonded to the substrate and the protective layer to provide a heat sink so that a high temperature concentrated at a small area in the protective layer dissipates in the intervening layer, the protective layer having embossments where it is separated from the intervening layer, with pockets of entrapped gas existing between the protective and intervening layers at the embossments, said process comprising: arranging the segments edge-to-edge with their respective substrates, protective layers and intervening layers aligned; with the segments so arranged, welding the segments together at their substrates; venting the pockets for those embossments that lie adjacent to the opposed edges of the segments; driving the vented embossments downwardly toward the intervening layer, so that the vented embossments become generally flush with the remainder of protective layers from which they formerly rose; placing a batten strip, which is formed from the same metal as the protective layers, over the protective layers such that it obscures the opposed edges of the two segments and covers the locations where the vented pockets are vented; and welding the batten strip to the protective layers along the edges of the batten strip, so that the locations where the vented pockets are vented lie between the two welds along the batten strip.

11. The process according to claim 10 wherein the metal of the welds along the edges of the batten strip is the same as the metal of the batten strip and the protective layers.

12. The process according to claim 11 wherein the metal of the intervening layer melts at a temperature substantially less than the metal of the protective layer.

13. The process according to claim 10 wherein the step of venting the pockets includes drilling a hole through the protective layer into each such pocket.

14. The process according to claim 10 and further comprising forming a rabbet in each segment along the edge thereof which locates opposite the edge of the other segment, with the rabbet eliminating the protective and intervening layers at those edges, whereby when the segments are arranged edge-to-edge, the rabbets form a groove that opens out of the protective layers, and placing a filler strip in the groove, with the filler strip being flush with the surface of the protective layer; and wherein the batten strip overlies and obscures the filter strip.

15. The process according to claim 10 wherein the protective layer, the batten strip and the weld along the edges of the batten strip are formed from tantalum, and the filler strip and intervening layer are formed from the same metal.

16. In a pressure vessel, the improvement comprising: first and second clad segments which are joined together at opposing edges and present as corrosion resistant interior face which is exposed to the interior of the vessel, each segment comprising a steel substrate which is presented outwardly and a protective layer which is carried by the substrate and presented inwardly to form a portion of the interior face, the protective layer having embossments and pockets located behind the embossments, with at least some of the pockets containing entrapped gas, the pockets adjacent to the opposed edges having been vented to relieve the entrapped gas from them, the substrate of the two plates being welded together along the opposing edges of the segments; and a batten strip overlying the protective layers of the two segments along the opposing edges of the segments so as to cover the edges, the batten strip further overlying the locations at which the pockets adjacent to the edges are vented, the batten strip being formed from the same metal as the protective layer and being welded along its edges to the protective layer so that the locations at which the pockets are vented lie between the welds which secure the batten strip.

17. The structure according to claim 16 wherein each segment further includes an intervening layer located between and bonded to the substrate and the protective layer, the intervening layer serving as a heat sink for dissipating heat concentrated in a small area of the protective layer at an elevated temperature so as to protect the substrate from elevated temperatures.

18. The structure according to claim 17 wherein the welds which secure the batten strip to the protective layer are formed from the same metal as the batten strip and the protective layers.

19. The structure according to claim 18 wherein the protective layers, the batten strip and the welds which attach the batten strip are formed from tantalum.

20. The weldment formed by the process set forth in claim 1.

* * * * *